United States Patent
Lord (10) Patent No.: US 12,301,282 B2
(45) Date of Patent: May 13, 2025

(54) OPTICAL SIGNAL TRANSMISSION

(71) Applicant: BRITISH TELECOMMUNICATIONS PUBLIC LIMITED COMPANY, London (GB)

(72) Inventor: Andrew Lord, London (GB)

(73) Assignee: British Telecommunications Public Limited Company (GB)

( * ) Notice: Subject to any disclaimer, the term of this patent is extended or adjusted under 35 U.S.C. 154(b) by 170 days.

(21) Appl. No.: 18/004,798

(22) PCT Filed: Jun. 21, 2021

(86) PCT No.: PCT/EP2021/066811
§ 371 (c)(1),
(2) Date: Jan. 9, 2023

(87) PCT Pub. No.: WO2022/008216
PCT Pub. Date: Jan. 13, 2022

(65) Prior Publication Data
US 2023/0246710 A1    Aug. 3, 2023

(30) Foreign Application Priority Data
Jul. 9, 2020 (GB) .................................. 2010559

(51) Int. Cl.
*H04B 10/079* (2013.01)
*H04B 10/25* (2013.01)
*H04J 14/02* (2006.01)

(52) U.S. Cl.
CPC ... *H04B 10/07953* (2013.01); *H04B 10/2589* (2020.05); *H04J 14/0215* (2013.01)

(58) Field of Classification Search
CPC .............................................. H04B 10/07953
See application file for complete search history.

(56) References Cited

U.S. PATENT DOCUMENTS

2002/0186432 A1* 12/2002 Roorda ............... H04J 14/0204
398/79
2006/0188260 A1* 8/2006 Nikolopoulos ......... H04J 3/085
398/83

(Continued)

FOREIGN PATENT DOCUMENTS

EP    3355490 A1    8/2018
EP    3355490 B1    5/2020

(Continued)

OTHER PUBLICATIONS

Combined Search and Examination Report under Sections 17 and 18(3) for Great Britain Application No. 2010559.9, mailed on Jan. 11, 2021, 8 pages.

(Continued)

*Primary Examiner* — Shi K Li
(74) *Attorney, Agent, or Firm* — EIP US LLP (57) ABSTRACT

A method of configuring an optical network comprising a switching system, a first node, a second node, and an optical link between the first node and the second node. The optical link includes a first optical connection and a second optical connection. The method includes changing a state of the switching system from a first state to a second state. In the first state, the optical network is configured to use the first and second optical connection to transmit first and second optical signals in first and second directions, respectively. In the second state the optical network is configured to use the second and first optical connections to transmit the first and second optical signals in the first and second directions, respectively.

24 Claims, 3 Drawing Sheets

(56) References Cited

U.S. PATENT DOCUMENTS

| | | |
|---|---|---|
| 2015/0098477 A1 | 4/2015 | Li et al. |
| 2018/0167704 A1 | 6/2018 | Goel et al. |
| 2018/0269976 A1 | 9/2018 | Fevrier |
| 2020/0033542 A1* | 1/2020 | Garrett ................. G02B 6/4427 |
| 2023/0098774 A1* | 3/2023 | Hasegawa ............... G06F 11/00 |

FOREIGN PATENT DOCUMENTS

| | | |
|---|---|---|
| JP | S5757041 A | 4/1982 |
| JP | S62200830 A | 9/1987 |

OTHER PUBLICATIONS

Examination Report under Section 18(3) for Great Britain Application No. 2010559.9, mailed on Sep. 23, 2022, 5 pages.
International Search Report and Written Opinion for Application No. PCT/EP2021/066811, mailed on Oct. 11, 2021, 14 pages.

* cited by examiner

OPTICAL SIGNAL TRANSMISSION

PRIORITY CLAIM

The present application is a National Phase entry of PCT Application No. PCT/EP2021/066811, filed Jun. 21, 2021, which claims priority from GB Patent Application No. 2010559.9, filed Jul. 9, 2020, each of which is hereby fully incorporated herein by reference.

TECHNICAL FIELD

The present disclosure relates to methods and systems for transmission of optical signals, and particularly to configuring an optical network for transmission of optical signals.

BACKGROUND

Installing an optical link between two nodes in an optical network typically involves an engineer performing a site visit and locating available optical fibers between the nodes. The engineer performs various measurements on the available fibers and selects a pair of fibers: one fiber for transmitting optical data downstream and another fiber for transmitting optical data upstream. The term "downstream" will be used herein to refer to a direction from a service provider, e.g. a server, to a client device, for example to download data from the data provider. The term "upstream" refers to the opposite direction than the downstream direction, e.g. for uploading data from a client device to a server. The engineer hardwires the fiber pair to end points at the point of installation. In some cases, multiple fiber pairs (each including two opposite-direction fibers) are connected together to form a complete optical link between two nodes.

However, if one of the fibers is damaged or degrades over time, the performance of the optical network may deteriorate. For example, the capacity of the optical network may be lower than an initial capacity of the optical network upon installation. This may be remedied by an engineer performing another site visit to repair or replace the fiber. However, this can be time consuming.

It is desirable to at least alleviate some of the aforementioned problems.

SUMMARY

According to a first aspect of the present disclosure, there is provided a method of configuring an optical network comprising a switching system, a first node, a second node, and an optical link between the first node and the second node, the optical link comprising a first optical connection and a second optical connection, the method comprising changing a state of the switching system from a first state to a second state, wherein: in the first state the optical network is configured to use: the first optical connection to transmit first optical signals in a first direction from the first node to the second node; and the second optical connection to transmit second optical signals in a second direction from the second node to the first node, the second direction being opposite to the first direction; and in the second state the optical network is configured to use: the second optical connection to transmit the first optical signals in the first direction; and the first optical connection to transmit the second optical signals in the second direction.

In some examples, changing the state of the switching system from the first state to the second state changes a difference between a first optical signal to noise ratio associated with transmission of the first optical signals and a second optical signal to noise ratio associated with transmission of the second optical signals. With the switching system in the first state, the difference may meet or exceed a threshold difference. Changing the state of the switching system from the first state to the second state may reduce the difference between the first optical signal to noise ratio and the second optical signal to noise ratio. The optical network may comprise an optical amplifier located such that there is a first distance between the optical amplifier and the first node and a second distance between the optical amplifier and the second node. In such cases, the difference between the first optical signal to noise ratio and the second optical signal to noise ratio may depend on a difference between the first distance and the second distance. In some cases, with the switching system in the second state, at least one of: a modulation of the first optical signals depends on the first optical signal to noise ratio, or a modulation of the second optical signals depends on the second optical signal to noise ratio.

In some examples, the switching system comprises at least one optical cross-connect.

In some examples, the method comprises determining to change the state of the switching system from the first state to the second state based on a characteristic of at least one of: the first optical connection, the first optical signals, the second optical connection, or the second optical signals. In these examples, the method may comprise: obtaining characteristic data representative of the characteristic; and determining to change the state of the switching system based on processing of the characteristic data. The characteristic data may be indicative of at least one of: a first optical signal to noise ratio associated with transmission of the first optical signals, a first data rate associated with the first optical signals, or a first material property of the first optical connection, a second optical signal to noise ratio associated with the second optical signals, a second data rate associated with the second optical signals, or a second material property of the second optical connection. Determining to change the state of the switching system from the first state to the second state may be based on determining that the first data rate is lower than the second data rate and the second optical signal to noise ratio is lower than the first optical signal to noise ratio. In these examples, the first node may be downstream from the second node. In examples involving determining to change the state of the switching system based on the characteristic, the method may include determining to change the state of the switching system from the first state to the second state in response to a change in the characteristic. The optical network may comprise a plurality of optical links, the plurality of optical links comprising the optical link. In such cases, determining to change the state of the switching system from the first state to the second state may comprise determining to change the state of the switching system from the first state to the second state based on a plurality of characteristics each associated with a respective one of the plurality of optical links.

In some examples, the first optical connection comprises a first optical fiber and the second optical connection comprises a second optical fiber, different from the first optical fiber.

In some examples, the method comprises: determining to change the state of the switching system from the first state to the second state; and, based on determining to change the state of the switching system, changing a modulation of at least one of the first optical signals or the second optical signals. In some of these examples, changing the modulation of the at least one of the first optical signals or the second optical signals comprises changing a modulation format for modulation of the at least one of the first optical signals or the second optical signals.

According to a second aspect of the present disclosure, there is provided an optical network comprising: a first node; a second node; an optical link between the first node and the second node, the optical link comprising a first optical connection and a second optical connection; and a switching system, wherein the switching system is switchable from a first state to a second state, and, in the first state the optical network is configured to use: the first optical connection to transmit first optical signals in a first direction from the first node to the second node; and the second optical connection to transmit second optical signals in a second direction from the second node to the first node, the second direction being opposite to the first direction; and in the second state the optical network is configured to use: the second optical connection to transmit the first optical signals in the first direction; and the first optical connection to transmit the second optical signals in the second direction.

In some examples, the switching system comprises at least one optical cross-connect.

In some examples, the optical network comprises: a first set of optical paths, the first optical connection corresponding to one of the first set of optical paths; and a second set of optical paths, the second optical connection corresponding to one of the second set of optical paths, wherein: with the switching system in the first state, the optical network is configured to use: the first set of optical paths to transmit the first optical signals in the first direction using spatial division multiplexing; and the second set of optical paths to transmit the second optical signals in the second direction using spatial division multiplexing; and with the switching system in the second state, the optical network is configured to use: n optical paths of the second set of optical paths to transmit the first optical signals in the first direction using spatial division multiplexing, where n is an integer; and n optical paths of the first set of optical paths to transmit the second optical signals in the second direction using spatial division multiplexing. Each of the first set of optical paths and each of the second set of optical paths may comprise a different respective optical fiber.

According to a third aspect of the present disclosure, there is provided a computing system for configuring the optical network according to the second aspect of the present disclosure, wherein the computing system is configured to generate control data for controlling a state of the switching system.

In some examples, the computing system is configured to: receive, from the optical network, characteristic data indicative of a characteristic of at least one of: the first optical connection, the first optical signals, the second optical connection, or the second optical signals; and generate the control data based on the characteristic data. The computing system may be configured to process the characteristic data using a neural network to generate the control data.

In some examples, the computing system is configured to: determine that, with the switching system in the first state, a difference between a first optical signal to noise ratio associated with transmission of the first optical signals using the first set of optical connections and a second optical signal to noise ratio associated with transmission of the second optical signals using the second set of optical connections meets or exceeds a threshold difference; and, in response, general the control data to change the state of the switching system from the first state to the second state.

According to a fourth aspect of the present disclosure, there is provided a method of operating an optical network comprising a switching system, a first node, a second node, and an optical link between the first node and the second node, the optical link comprising a first optical connection and a second optical connection, the method comprising: with the switching system in a first state: transmitting first optical signals in a first direction from the first node to the second node, using the first optical connection; transmitting second optical signals in a second direction from the second node to the first node, using the second optical connection, the second direction being opposite to the first connection; changing a state of the switching system from the first state to a second state; and, with the switching system in the second state: transmitting the first optical signals in the first direction, using the second optical connection; and transmitting the second optical signals in the second direction, using the first optical connection.

Examples herein relate to methods and/or apparatus substantially as herein described and/or as illustrated with reference to the accompanying drawings. Any apparatus feature may also be provided as a corresponding step of a method, and vice versa.

Any feature in one aspect of the present disclosure may be applied, in any appropriate combination, to other aspects of the present disclosure. Any, some and/or all features in one aspect can be applied to any, some and/or all features in any other aspect, in any appropriate combination. Particular combinations of the various features described and defined in any aspects of the disclosure can be implemented and/or supplied and/or used independently.

As used throughout, the word 'or' can be interpreted in the exclusive and/or inclusive sense, unless otherwise specified.

Examples herein relate to a method of configuring an optical network, an optical network, a computing system, and a method of operating an optical network as described herein and/or substantially as illustrated with reference to the accompanying drawings. In examples herein, a method of configuring an optical network comprising a switching system, a first node, a second node, and an optical link between the first node and the second node is provided. The optical link comprises a first optical connection and a second optical connection. The method comprises changing a state of the switching system from a first state to a second state. In the first state, the optical network is configured to use the first and second optical connection to transmit first and second optical signals in first and second directions, respectively. In the second state the optical network is configured to use the second and first optical connections to transmit the first and second optical signals in the first and second directions, respectively.

BRIEF DESCRIPTION OF THE DRAWINGS

Examples are now described, with reference to the accompanying diagrammatic drawings, in which.

DETAILED DESCRIPTION

The following description is presented to enable any person skilled in the art to make and use the system, and is provided in the context of a particular application. Various modifications to the disclosed embodiments will be readily apparent to those skilled in the art.

Methods and systems in accordance with the present disclosure can be used to configure an optical network to change a direction in which optical signals are transmitted along a first and second optical connection of an optical link between a first node and a second node. For example, rather than transmitting first optical signals from the first node to the second node using the first optical connection, the optical network can be configured to instead use the second optical connection to transmit the first optical signals from the first node to the second node. Similarly, the optical network can be configured to use the first optical connection to transmit second optical signals from the second node to the first node, rather than the second optical connection. The configuration of the optical network is changed by changing a state of a switching system in examples herein. In this way, the optical network can be dynamically reconfigured as needed, e.g. to compensate for a change in performance of an optical connection or a change in network usage, or to reduce asymmetries in a performance of a portion of the optical network between the two nodes. The approaches herein therefore facilitate more straightforward reconfiguration of the optical network than existing approaches, which e.g. involve an engineer performing a site visit and replacing individual optical fibers or re-wiring individual optical fibers. Moreover, the approaches described herein can improve the flexibility of the optical network, as the performance of the optical network can be dynamically adjusted by adjusting the configuration of the optical network.

Figure 1A:
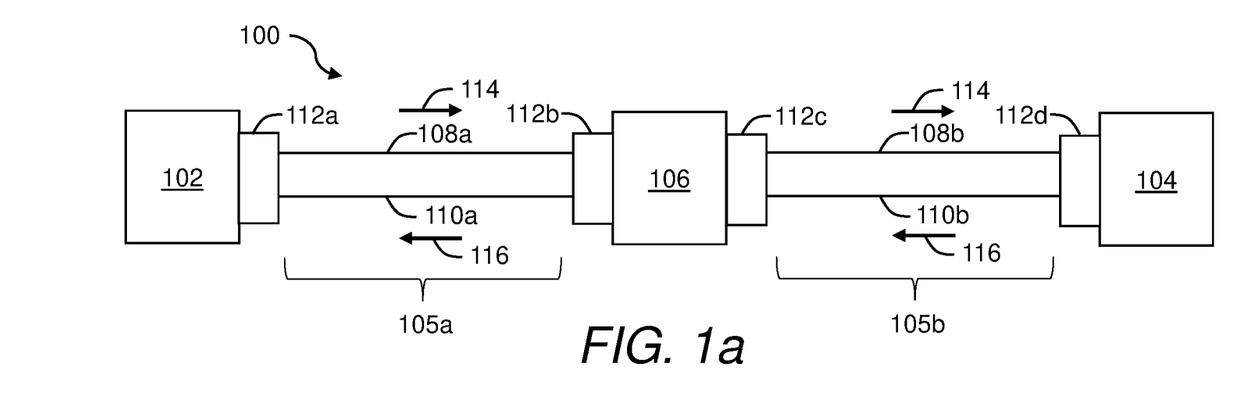
FIG. 1a is a schematic diagram of a portion of an optical network with a switching system in a first state according to an example.

FIG. 1a is a schematic diagram of a portion of an optical network 100 according to an example. The optical network 100 is for example a telecommunications network arranged to transmit information using light signals, which may be referred to as optical signals. The optical network 100 has a first node 102, a second node 104 and an intermediate node 106 between the first and second nodes 102, 104. A node is for example an endpoint of the optical network or a redistribution point of an optical network, e.g. to send an optical signal to another node or an endpoint. A node may additionally or alternatively be an element of an optical network, such as an optical amplifier (e.g. an Erbium Doped Fiber Amplifier, EDFA), for adjusting a property of an incident optical signal.

The first node 102 is connected to the second node 104 via a first optical link 105a and a second optical link 105b. The first optical link 105a connects the first node 102 to the intermediate node 106 and the second optical link 105b connects the intermediate node 106 to the second node 104. In FIG. 1a, the first optical link 105a includes a first and second optical connection, which in this example are a first optical fiber 108a and a second optical fiber 110a, respectively. The second optical link 105b also includes a first and second optical connection, which in this example are a first optical fiber 108b and a second optical fiber 110b. The first and second optical links 105a, 105b may be referred to collectively as optical links 105, the first optical connections 108a, 108b of the optical links 105 may be referred to collectively as first optical connections 108, and the second optical connections 110a, 110b may be referred to collectively as second optical connections 110. Each of the optical fibers of the first and second optical links 105a, 105b is a different respective optical fiber in this case. The optical fibers between of a given optical link (e.g. the first and second optical fibers 108a, 110a of the first optical link 105a) may hence be separate fibers, which may be arranged in the same or a different bundle of optical fibers, or in a different arrangement than a bundle.

The optical network 100 of FIG. 1a also includes a switching system which is switchable between at least a first state and a second state in order to change a configuration of the optical network 100. In this example, the switching system includes optical cross-connects (OXCs) 112a, 112b, 112c, 112b (which may referred to collectively with the reference numeral 112). An OXC is a device for switching optical signals and may be implemented in various ways. For example, an OXC may be an opaque OXC, which converts optical signals into electronic signals, switches the electronic signals, and converts the switched electronic signals back into optical signals. An OXC may instead be a transparent OXC, which switches optical signals in the optical domain. A further example of an OXC is a translucent OXC, which includes both an optical switch module and an electronic switch module so that optical signals can be switched using either the optical or the electronic switch module.

A first OXC 112a is arranged at an output of the first node 102, between the first node 102 and the intermediate node 106. A second OXC 112b is arranged at an output of the intermediate node 106, between the first node 102 and the intermediate node 106. A third OXC 112c is arranged at another output of the intermediate node 106, between the intermediate node 106 and the second node 104. A fourth OXC 112d is arranged at an output of the second node 104, between the intermediate node 106 and the second node 104. Although in FIG. 1a the OXCs 112 are shown as separate components than the nodes 102, 104, 106, it is to be appreciated that, in some cases, at least one OXC of the switching system may be integrated with a corresponding node of the optical network 100. For example, the first OXC 112a may form part of the first node 102 and so on.

In FIG. 1a, the switching system is in a first state. With the first switching system in the first state, the optical network 100 is configured to use the first optical fibers 108 to transmit first optical signals 114 in a first direction from the first node 102 to the second node 104, and to use the second optical fibers 110 to transmit second optical signals 116 in a second direction, opposite to the first direction, from the second node 104 to the first node 102. The direction of the arrows designating the first and second optical signals 114, 116 indicates the direction in which the first and second optical signals 114, 116 are transmitted. In this case, with the switching system in the first state, the first optical signals 114 are transmitted from the first node 102 to the intermediate node 106, and then from the intermediate node 106 to the second node 104. Conversely, the second optical signals 116 are transmitted from the second node 104 to the intermediate node 106, and then from the intermediate node 106 to the first node 102.

In this example, the first and second optical fibers 108, 110 of the optical links 105 are pre-configured, e.g. upon installation, to transmit optical signals in the first and second directions, respectively. The first state of the switching system may therefore be considered to correspond to an initial state, e.g. corresponding to the state of the switching system upon installation of the first and second optical fibers 108, 110. This may be considered to be a default state of the switching system.

Figure 1B:
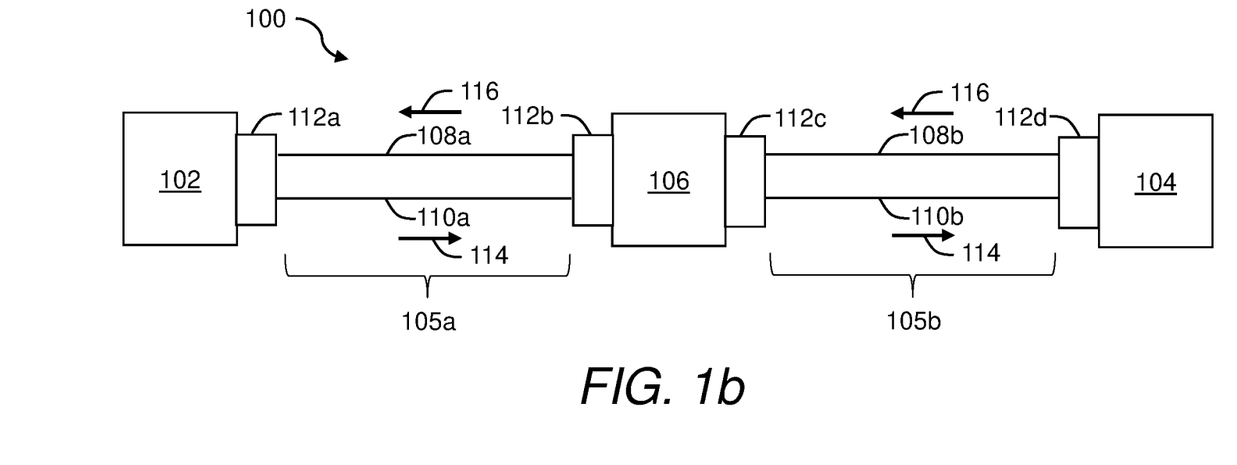
FIG. 1b is a schematic diagram of the portion of the optical network of FIG. 1a with the switching system in a second state according to an example.

In the example of FIG. 1a, the configuration of the optical network 100 is adjustable using the switching system. In this way, the configuration of the optical network 100 can be changed from a predefined configuration (e.g. corresponding to a default configuration of the optical network 100), without manually rewiring or replacing the optical connections. FIG. 1b shows schematically the portion of the optical network 100 shown in FIG. 1a, but with the switching system changed from the first state to a second state according to an example. In the example second state shown in FIG. 1b, the optical network 100 is configured to use the first optical fibers 108 to transmit the second signals 116 in the second direction, rather than to transmit the first signals 114 in the first direction. In other words, the direction in which the first optical fibers 108 transmits optical signals is reversed by changing the state of the switching system from the first state to the second state. Similarly, with the switching system in the example second state of FIG. 1b, the optical network 100 is configured to use the second optical fibers 110 to transmit the first signals 114 in the first direction, rather than to transmit the second signals 116 in the second direction.

Changing the state of the switching system in this example changes which optical fibers are connected to which other optical fibers, thereby changing the direction in which various optical signals are transmitted by the optical fibers. In this case, the first node 102 receives the first optical signals 114 as an input, e.g. via another optical fiber connected to an input port of the first node 102 on the opposite side of the first node 102 to the first OXC 112a (not shown in FIG. 1b). In the first state (shown in FIG. 1a), the first OXC 112a (alone or in conjunction with a further switching element, e.g. another OXC, arranged at the input port of the first node 102) directs the first optical signals 114 towards the first optical fiber 108a of the first optical link 105a. In the example second state of FIG. 1b, though, the first OXC 112a (alone or in conjunction with the other switching element associated with the first node 102) instead directs the first optical signals 114 towards the second optical fiber 110a of the first optical link 105a, for transmission in the first direction to the second node 104 (via the intermediate node 106).

In a similar way, the second node 104 receives the second optical signals 116 as an input, e.g. via another optical connection of the second set, which is connected to an input port of the second node 104 on the opposite side of the second node 104 to the fourth OXC 112d (not shown in FIG. 1b). In the first state (shown in FIG. 1a), the fourth OXC 112d (alone or in conjunction with a further switching element, e.g. another OXC, arranged at the input port of the second node 104) directs the second optical signals 116 towards the second optical fiber 110b of the second optical link 105b. In the example second state of FIG. 1b, though, the fourth OXC 112d (alone or in conjunction with the other switching element associated with the second node 104) instead directs the second optical signals 116 towards the first optical fiber 108b of the second optical link 105b, for transmission in the first direction to the second node 102 (via the intermediate node 106).

The state of the second and third OXCs 112b, 112c is the same in the first state and in the example second state of FIG. 1b. Hence, in the second state shown in FIG. 1b, the second and third OXCs 112b, 112c continue to connect the first optical fiber 108a of the first optical link 105a to the first optical fiber 108b of the second optical link 105b and the second optical fiber 110a of the first optical link 105a to the second optical fiber 110b of the second optical link 105b. However, due to the change in state of the first and fourth OXCs 112a, 112d, the first signals 114 are transmitted using the second optical fibers 110a, 110b of the first and second optical links 105a, 105b, and the second signals 116 are transmitted using the first and second optical fibers 108a, 108b of the first and second optical links 105a, 105b.

The second state of FIG. 1b is merely an example and other second states are possible. For example, whereas in the example of FIG. 1b, changing the state of the switching system from the first state to the second state changes the direction of transmission of the optical signals along each of the optical fibers 108, 110 of each of the optical links 105 between the first and second nodes 102, 104, this need not be the case in other examples. In other examples, e.g. in which there are a plurality of optical links between a first node and a second node, changing the state of the switching system may change a direction of transmission of the optical signals along optical connections of at least one of the optical links without changing the direction of transmission of the optical signals along optical connections of another at least one of the optical links.

Figure 1C:
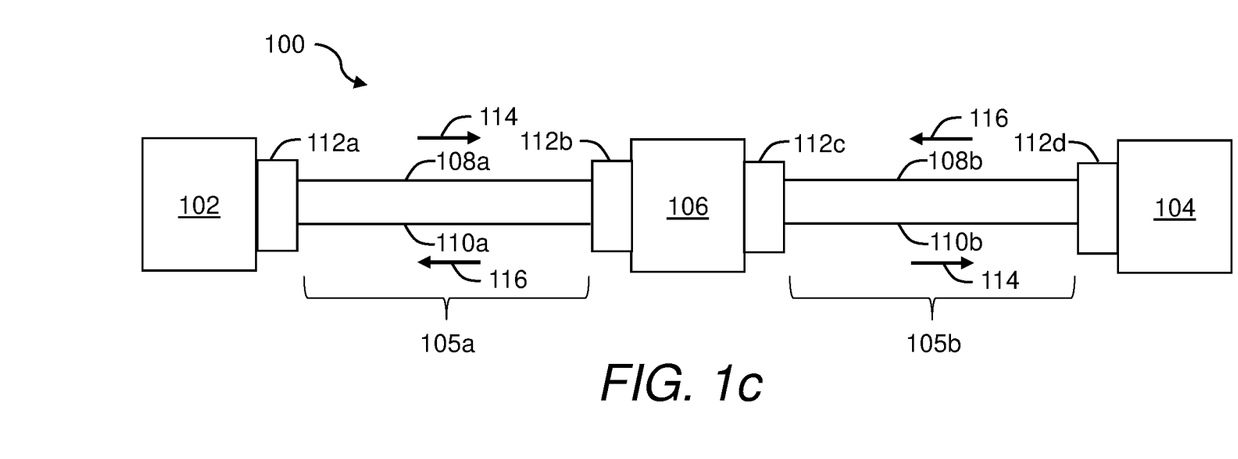
FIG. 1c is a schematic diagram of the portion of the optical network of FIG. 1a with the switching system in a second state according to a further example.

Such an example is shown schematically in FIG. 1c, which illustrates the portion of the optical network 100 shown in FIG. 1a, but with the switching system changed from the first state to a second state according to a further example, which is different from the example second state shown in FIG. 1b. In the example of FIG. 1c, changing the state of the switching system from the first state to the second state has changed the direction of transmission of optical signals along the first and second optical fibers 108b, 110b of the second optical link 105b, without changing the direction of transmission of optical signals along the first and second optical fibers 108a, 110a of the first optical link 105a. In this case, with the switching system in the second state, the first signals 114 are transmitted from the first node 102 to the second node 104 via the first optical fiber 108a of the first optical link 105a, and via the second optical fiber 110b of the second optical link 105b. The second signals 116 are transmitted from the second node 104 to the first node 102 via the first optical fiber 108b of the second optical link 105b and via the second optical fiber 110a of the first optical link 105a. In the example of FIG. 1c, changing the switching system to the second state has not changed the state of the first OXC 112a. However, the state of the second and third OXCs 112b, 112c has been switched to connect an input of the intermediate node 106 corresponding to the first optical fiber 108a of the first optical link 105a to an output of the intermediate node 106 corresponding to the second optical fiber 110b of the second optical link 105b (rather than to an output corresponding to the first optical fiber 108b of the second optical link 105b, as in the first state). Similarly, by switching the state of the second and third OXCs 112b, 112c to the second state of FIG. 1c, an input of the intermediate node 106 corresponding to the second optical fiber 108b of the second optical link 105b is connected to an output of the intermediate node 106 corresponding to the second optical fiber 110a of the first optical link 105a. The fourth OXC 112d has also been appropriately configured so as to direct incoming optical signals for transmission in the second direction (the second signals 116) for transmission via the first optical fiber 108b of the second optical link 105b, rather than via the second optical fiber 110b of the second set.

From the above description, it can be seen that, in these examples, each node has two input ports and two output ports. The two input ports are arranged on opposite sides of the node (i.e. with one arranged on an upstream side of the node, closer to a service provider, and the other arranged on a downstream side of the node, closer to a client device). Similarly, the two output ports are also arranged on opposite sides of the node, so that each side of the node has an input and an output. The switching system (which in these examples includes the OXCs 112) can be used to change which input port is connected to which output port, in order to change which of the optical fibers of a given optical link is used to transmit optical signals upstream (e.g. in the first direction), and which of the optical fibers of the optical link is used to transmit optical signals downstream (e.g. in the second direction, opposite to the first direction). This is merely an example, though, and in other cases each node may have more or fewer ports.

As can be seen from the examples of FIGS. 1a to 1c, providing an optical network 100 with a switching system allows a configuration of the optical network 100 to be changed dynamically, e.g. in dependence on changing properties of the optical network 100. In this way, the optical network 100 can be easily reconfigured. The use of the switching system in these examples allows at least one of the optical fibers 108, 110 to transmit optical signals in one of two different directions, depending on the direction in which the optical signals are incident on the optical fiber. The optical network 100 is therefore more flexible than existing optical networks, which are hardwired so that each optical fiber transmits optical signals in a single direction.

The optical performance of each optical connection (e.g. each optical fiber) is typically not the same, e.g. due to different characteristics of the optical connections. For example, different optical connections typically have different losses, repairs, splices and so on. Furthermore, individual optical connections may be damaged or may suffer from reduced performance over time. The performance of a given optical connection may be represented by the signal to noise ratio (SNR), which is sometimes referred to as an optical signal to noise ratio (OSNR), or by another metric such as an attenuation associated with transmission of optical signals using the optical connection or a quality of optical signals transmitted using the optical connection.

The performance of the optical network 100 generally depends on the performance of individual optical connections. Hence, a variation in performance between different optical connections may lead to an asymmetry in performance of an optical network, such as the optical network 100 of FIGS. 1a to 1c. In other words, the performance for transmission of the first signals in the first direction from the first node 102 to the second node 104 may be different from the performance for transmission of the second signals in the second direction from the second node 104 to the first node 102. An asymmetry may be exacerbated if the optical connections with a lower performance are all arranged to transmit optical signals in the same direction. In general, if an optical network includes L optical links between two nodes, and each optical link includes two optical connections, the number of combinations for hardwiring the optical connections is $2^{(L-1)}$.

In the present case, rather than determining an optimal configuration of the optical connections, e.g. to reduce an asymmetry, before subsequently hardwiring the optical connections to transmit optical signals in a fixed direction, the optical network 100 is configurable to change the direction in which optical signals are transmitted via at least one optical connection (e.g. via at least one optical link between two nodes). In this way, an asymmetry in performance of the optical network 100 can be reduced.

For example, changing the state of the switching system from the first state to the second state can be used to change a difference between a first OSNR associated with transmission of the first optical signals and a second OSNR associated with transmission of the second optical signals. The OSNR is for example the ratio between the signal power and the noise power in a given bandwidth (e.g. a reference bandwidth of 0.1 nanometers) for a given signal, and may be measured e.g. using an optical spectrum analyzer. The first and second OSNR may be measured at a given point between the first and second nodes 102, 104 (which may be different for the first OSNR and the second OSNR). For example, the first OSNR may be measured or otherwise determined using the first optical signals incident on the second node 104, to reflect changes in the OSNR due to transmission of the first optical signals to the second node 104. Similarly, the second OSNR may be determined using the second optical signals incident on the first node 102. In other cases, though, the first and second OSNR may be determined at a different location.

In these examples, the difference indicates a degree of asymmetry between the performance of the optical network 100 for transmission of the first signals in the first direction and transmission of the second signals in the second direction. Hence, by changing the difference between the first and second OSNR, changing the state of the switching system can in turn change the degree of asymmetry in a performance of the optical network 100, by changing which optical connection(s) are used to transmit the first optical signals, and which are used to transmit the second optical signals. For example, the state of the switching system from the first state to the second state can be changed to reduce the difference between the first OSNR and the second OSNR, to reduce the asymmetry.

In some cases, it may be determined to change the state of the switching system from the first state to the second state based on the difference. For example, with the switching system in the first state, the difference may meet or exceed a threshold difference, which e.g. represents a tolerable asymmetry in the optical network 100. In such cases, by switching the state of the switching system to the second state the difference may be reduced to reduce the asymmetry. For example, the difference may be reduced so it is less than the threshold difference, thereby reducing the asymmetry to a tolerable or otherwise acceptable level.

Figure 2:
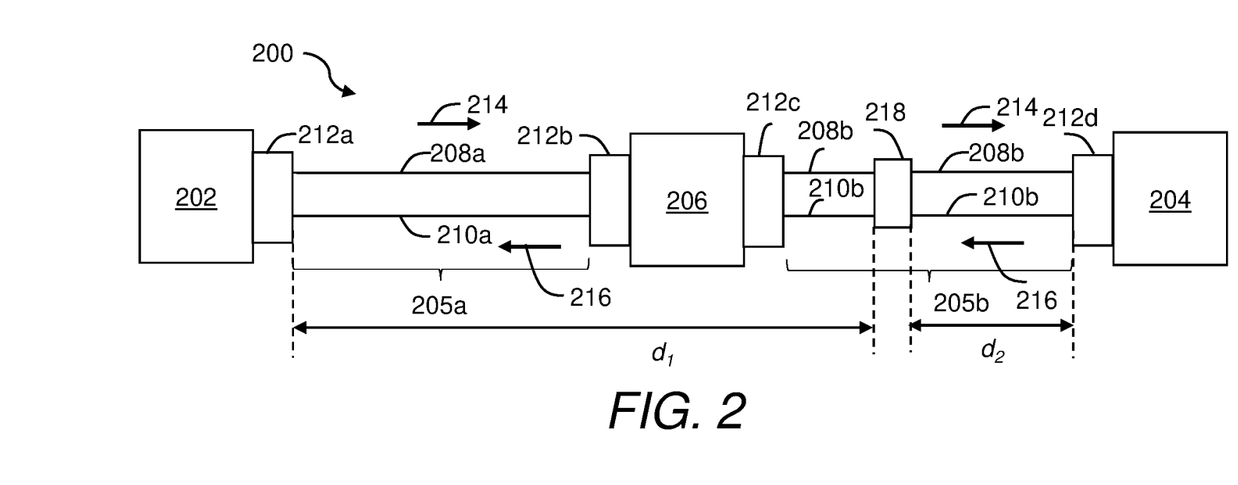
FIG. 2 is a schematic diagram of a portion of an optical network according to a further example.

An asymmetry in the performance of the optical network 100 may also arise due to the positioning of an optical amplifier with respect to the first and second nodes 102, 104 of the optical network 100. FIG. 2 illustrates an example of a portion of an optical network 200 that includes an optical amplifier 218. Features of FIG. 2 that are similar to corresponding features of FIGS. 1a to 1c are labelled with the same reference numerals incremented by 100; corresponding descriptions are to be taken to apply. As in FIG. 1, the optical network 200 includes a first node 202, a second node 204 and intermediate node 206, and four OXCs 212a-212d, which form part of a switching system. A first optical link 205a including first and second optical fibers 208a, 210a is between the first node 202 and the intermediate node 206. A second optical link 205b including first and second optical fibers 208b, 210b is between the intermediate node 206 and the second node 204.

In FIG. 2, the optical amplifier 218 is in the path of the first and second optical fibers 208b, 210b of the second optical link 205*b*, and hence divides each of the first and second optical fibers 208*b*, 210*b* into two. Optical signals incident on the optical amplifier 218 (via the first and second optical fibers 208*b*, 210*b*) are amplified by the optical amplifier 218. The optical amplifier 218 is located such that there is a first distance, $d_1$, between the optical amplifier 218 and the first node 202 and such that there is a second distance, $d_2$, between the optical amplifier 218 and the second node 204. In this example, the first distance is different from the second distance. This can occur as optical amplifiers 218 are typically located in a convenient intermediate building that is located between the first and second nodes 202, 204, which may not be exactly equidistant between the first and second nodes 202, 204.

In FIG. 2, the switching system is in a first state, which is similar to the first state shown in FIG. 1*a*. Due to the difference between the first and second distances, first optical signals 214 transmitted from the first node 202 for transmission to the second node 204 have to travel a different distance to the optical amplifier 218 (in this case, via the first optical fibers 208*a*, 208*b* of the optical links 205) than second optical signals transmitted from the second node 204 to the optical amplifier 218 (in this case, via the second optical fiber 210*b* of the second optical link 205*b*). There is hence a difference between a first OSNR associated with transmission of the first optical signals 214 and a second OSNR associated with transmission of the second optical signals 216, where in this example the first and second OSNRs are based on the first and second optical signals 214, 216 after amplification, respectively. This is because the OSNR of the first optical signals 214 will have decreased to a greater extent than the OSNR of the second optical signals 216 by the time the first optical signals 214 are incident on the optical amplifier 218. The effect of the noise on the first optical signals 214 will therefore be amplified to a greater extent than that on the second optical signals 216, so that the first OSNR after amplification is lower than the second OSNR after amplification.

Change the state of the switching system to change an asymmetry in a performance of an optical link of the optical link 100 is merely an example. In other cases, it may be determined to change the state of the switching system based on a characteristic of at least one of the optical connections in the optical network, the first optical signals and/or the second optical signals.

A characteristic of an optical connection is for example a material property of the optical connection, indicating at least one physical feature of the optical connection. For example, a material property may be, include or depend on a material the optical connection is formed of or includes or a structure of the optical connection. A material property such as this typically indicates an expected performance of the optical connection, as transmission characteristics of the optical connection (e.g. an OSNR or an attenuation) generally depend on physical attributes of the optical connection. For example, if a particular optical connection has been repaired, the performance of the optical connection may be lower than a recently installed optical connection that has not been repaired.

A characteristic of an optical signal for example represents a property of the optical signal itself, which may vary over time, and which in some cases depends on the transmission characteristics of the optical connection via which the optical signal is transmitted. For example, the characteristic of the optical signal may be an OSNR of the optical signal or another transmission characteristic of the optical signal, such as an attenuation of the optical signal after transmission of the optical signal via the optical connection.

In other cases, the characteristic of the optical signal may be independent of the optical connection, such as a data rate associated with the optical signal. A data rate may be referred to as a bit rate, and for example represents or otherwise depends on the number of bits of the optical signal that are transmitted via the optical connection per unit time. The data rate in an optical network is asymmetric in some cases. For example, the downstream data rate (i.e. the rate of data transmitted downstream, from the service provider to the client device, may be higher than the upstream data rate (i.e. the rate of data transmitted upstream, from the client device to the service provider). This is because the download rate for a client device is generally higher than the upload rate.

The configuration of an optical network, such as the optical network 100 of FIGS. 1*a* to 1*c* can be adjusted to exploit the asymmetry in data rate. For example, with reference to FIGS. 1*a* and 1*c*, if a first data rate for transmitting the first optical signals 114 via the first optical fibers 108 of the first and second optical links 105*a* is lower than a second data rate for transmitting the second optical signals 116 via the second optical fibers 110 of the first and second optical links 105*b*, the lower data rate signals (in this case, the first optical signals 114) can be transmitted via lower performance optical connections without unduly affecting the performance of the optical network 100. For example, if it is determined that the second optical fiber 110*b* of the second optical link 105*b* has lower performance (e.g. a lower OSNR) than the first optical fiber 108*b* of the second optical link 105*b*, the lower data rate signal (i.e. the first optical signals 114) can be switched from the first optical fiber 108*b* to the second optical fiber 110*b* of the second optical link 105*b*, as shown in FIG. 1*c*. In this way, the higher data rate signal (i.e. the second optical signals 116 in this case) can be transmitted via the higher performance optical fibers (the first optical fiber 108*b* of the second optical link 105*b* in this case). The first data rate may be lower than the second data rate where the first node 102 is downstream from the second node 104. This approach is counterintuitive: rather than trying to decrease an asymmetry in a performance of the optical network 100, this approach instead involves increasing the asymmetry in the performance of the optical network so as to prioritize the transmission of a higher data rate signal.

In further examples, a modulation of at least one of the first optical signals or the second optical signals can be controlled appropriately given the state of the switching system. Modulation for example involves varying at least one property (e.g. amplitude or frequency) of a waveform (which may be referred to as a carrier signal) with a modulating signal that includes the information to be transmitted. An example of modulation is Quadrature Amplitude Modulation (QAM), which may be used to convey two signals by modulating the amplitudes of carrier waves, e.g. using an amplitude-shift keying (ASK) or amplitude modulation (AM) scheme.

Modulation may be performed by a transponder arranged to send and receive an optical signal (e.g. the first and/or second optical signals) from an optical connection, such as the optical connections described herein. In examples herein, the modulation may be changed dynamically, e.g. in response to a change in the state of the switching system and/or a change in network traffic or another characteristic of the optical network or an optical connection of the optical network. For example, a dynamically programmable modulation format may be used to achieve different transponder data rates. This can be achieved by changing the state of a modulator of the transponder to effect different modulation levels, e.g. different QAM formats such as Quadrature Phase Shift Keying (QPSK), 8 QAM or 16 QAM.

Each modulation format (e.g. each QAM format) typically has a different data rate and a different performance level, e.g. a different OSNR requirement for an optical signal. With the approaches herein, the configuration of the optical network can be appropriately controlled in conjunction with the modulation applied to at least one of the first or second optical signals, e.g. to optimize performance of the optical network. For example, the optical connection(s) used to transmit the higher data rate signal may be configured to make greater use of the available bandwidth, e.g. by using a higher level of QAM. The level of QAM (which may be considered to be an example of a modulation format) may depend on properties of the higher data rate signal and/or the optical connection(s) used to transmit the higher data rate signal, e.g. the OSNR associated with transmission of the higher data rate signal using the optical connection(s). In addition or instead, if an optical connection degrades over time, a modulation can be adjusted (e.g. by lowering the QAM index), to optimize the rate of transmission of optical signals via the optical connection. In this way, the data rate can be optimized, e.g. maximized, for an optical network with a given OSNR for transmission of optical signals from a first node to a second node (or vice versa). In other words, a modulation of the first optical signals may depend on the first OSNR and/or a modulation of the second optical signals may depend on the second OSNR. The modulation may hence be changed if there is a change or an anticipated change in the first and/or second OSNR, e.g. if it is determined that a state of the switching system is to be changed. The modulation may be changed for example by changing a modulation format for modulation of a given optical signal (such as the first and/or second optical signals).

The network traffic of the optical network 100 may change over time. The configuration of the optical network 100 may in turn be changed straightforwardly by changing the state of the switching system. For example, as new wavelengths are included in optical signals transmitted by the optical network 100, the performance of at least one of the optical connection(s) may change. The performance of a given optical connection may also change over time, e.g. due to ageing or repairs. Such a change in performance can be compensated for dynamically by changing the state of the switching system.

In some cases, characteristic data representative of the characteristic data is obtained, and it is determined to change the state of the switching system based on processing of the characteristic data. In these cases, the optical network 100 may include an appropriate measurement system for obtaining the characteristic data, such as an optical spectrum analyzer for measuring the OSNR and/or an optical time-domain reflectometer (OTDR) which may be used to measure properties of an optical connection, such as an attenuation, which may be referred to as a loss. In other cases, the characteristic data may be obtained from a suitable data storage system. This may be the case where the characteristic data indicates inherent material properties of an optical connection, which may be recorded in a database or other storage system upon installation of the optical connection or after repairing or otherwise modifying the material properties of the optical connection.

It may be determined to change the state of the switching system from the first state to the second state in response to a change in the characteristic represented by the characteristic data. For example, if the asymmetry in the first OSNR and the second OSNR as discussed above meets or exceeds a threshold difference, if the first data rate meets a particular condition and/or if the second data rate meets a particular condition, the state of the switching system may be changed. In other cases, the change in the characteristic may be due to an intervention in the optical network 100, e.g. to repair or replace an optical connection.

From the examples of FIGS. 1a to 1c, it will be appreciated that an optical network 100 may include a plurality of optical links 105 between a first node 102 and a second node 104. The potential combinations of optical connections for transmission of optical signals in a given direction in such cases quickly grows as the number of optical links 105 in the network 100 increases, which in turn complicates the determination of an appropriate set of optical connections for transmission of the optical signals, e.g. to obtain a desired performance. Furthermore, a larger number of possible combinations of optical connections generally leads to a larger spread in performance of optical links. However, the approaches herein may also or instead be applied to simplify the determination of an appropriate configuration for an optical network 100 including a plurality of optical links 105.

In these cases, it may be determined to change the state of the switching system based on a characteristic associated with a single optical link (e.g. a property of at least one of the optical connections of the optical link and/or a property of the optical signals as transmitted via the at least one of the optical connections). This may be the case for example where the optical link plays a major role in the optical network 100, e.g. due to the optical paths that traverse that particular optical link. Alternatively or in addition, the state of the switching system may be changed based on a plurality of characteristics, each associated with a respective one of the plurality of optical links, either taken alone or in combination. In some cases, the determination to change the state of the switching system may be performed based on a respective characteristic of at least one optical connection of the optical network 100, taken in conjunction with a combined characteristic obtained by combining characteristics of a plurality of optical connections of the optical network 100. In other cases, such a combined characteristic may be used to determine whether to change the state of the switching system.

The approaches herein may therefore be applied flexibly. In this way, the optical network 100 can be appropriately configured for example to optimize the performance of a particular optical link (e.g. by reducing or increasing the asymmetry of the optical link), a portion of the optical network 100 (such as a path formed of a series of optical links) or the optical network 100 as a whole.

It is to be appreciated that the determination of whether to change the state of the switching system may be performed in various ways. For example, the characteristic data may be processed by a machine learning system, such as a neural network, that has been trained to appropriately identify an appropriate configuration for the optical network 100, e.g. to achieve a desired performance. In such cases, the characteristic data may be sent to a computing system arranged to implement the trained machine learning system. In other cases, the determination may be based on a metric with a value that depends on the characteristic data.

Figure 3:
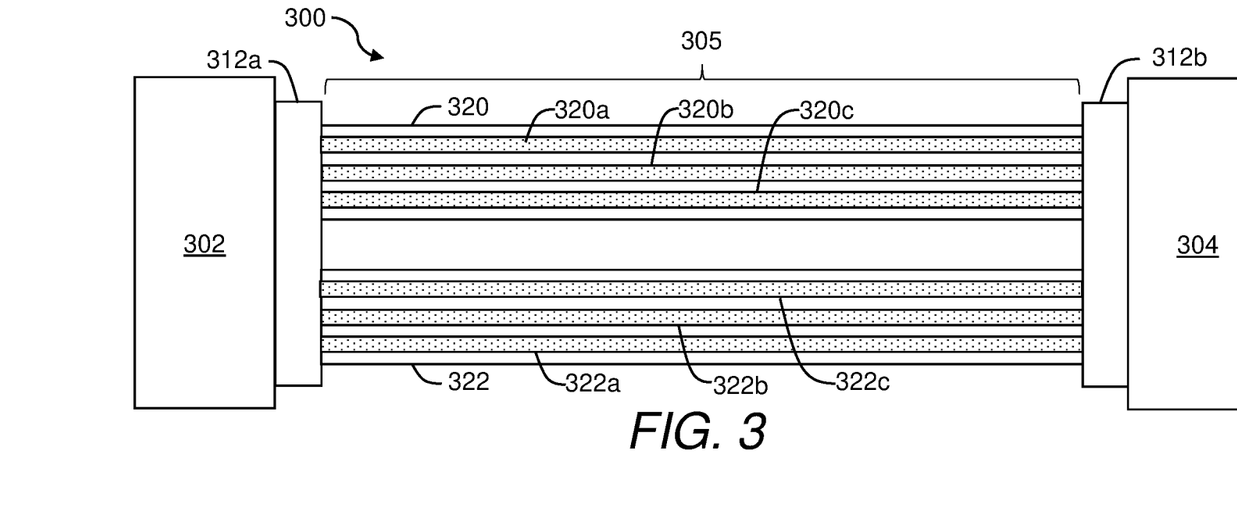
FIG. 3 is a schematic diagram of a portion of an optical network according to a yet further example.

The optical network 300 may be configured automatically, e.g. based on the characteristic data. For example, characteristic data may be obtained and processed periodically and the state of the switching system may be automatically changed (e.g. without human input) based on the result of the processing of the characteristic data. This further simplifies configuring of the optical network 300 compared to existing approaches that involve an engineer manually reconfiguring an optical network.

In the examples above, the optical links 105, 205 each include two optical connections (which in FIGS. 1a to 1c and FIG. 2 are optical fibers). However, in other cases, an optical connection of an optical link such as the optical links 105, 205 may include a plurality of optical paths for transmission of optical signals using spatial division multiplexing. FIG. 3 illustrates such an example.

FIG. 3 is a schematic diagram showing a portion of an optical network 300 including a first node 302 and a second node 304 and an optical link 305 between the first and second nodes 302, 304. The optical link 305 in this example includes a first set of optical paths 320 and a second set of optical paths 322. As the optical link 305 includes a plurality of optical paths, the optical link 305 can be used to transmit optical signals using spatial division multiplexing. Spatial division multiplexing for example involves utilizing a plurality of spatial channels to transmit optical signals, e.g. to increase the bandwidth of an optical link 305. In FIG. 3, the first set of optical paths 320 includes three optical fibers 320a, 320b, 320c and the second set of optical paths 322 also includes three optical fibers 322a, 322b, 322c. This is merely an example, though, and in other cases the first and second sets of optical paths may include more or fewer optical fibers and/or may include a different number of optical fibers than each other. For example, in some cases, a set of optical paths for performing spatial division multiplexing may include 60 or more optical paths. In FIG. 3, each of the optical fibers is considered to correspond to a respective optical path for transmission of optical signals. In other cases, an optical path for spatial division multiplexing may be a core of a multi-core optical fiber. In FIG. 3, one of the first set of optical paths 320 (such as a first one 320a) may be considered to correspond to a first optical connection 108, 208 such as those described with reference to FIGS. 1 and 2. Similarly, one of the second set of optical pats 322 (such as a first one 322b) may be considered to correspond to a second optical connection 110, 210 such as those described with reference to FIGS. 1 and 2.

The optical network 300 of FIG. 3 may be configured by changing a state of a switching system (which in this case includes OXCs 312a, 312b associated with the first and second nodes 302, 304) respectively, e.g. as described with reference to other examples herein. For example, the direction of transmission of optical signals along a given optical path of at least one of the first and/or second sets of optical paths 320, 322 may be switched by changing the state of the switching system. In such cases, n optical paths of a given set of optical paths may be switched in the same direction (i.e. so that the n optical paths of a given set of optical paths continue to transmit optical signals in the same direction as each other, which direction may be changed over time by changing the state of the switching system). In these examples, n is an integer, which may take any value from 1 to N, where N is the total number of optical paths of a set of optical paths. In this way, the methods provide increased flexibility for configuring higher complexity optical networks 300 in a simple manner. For example, each of the optical paths may be independently configured to transmit optical signals in a given direction, but such that half of the optical paths transmit optical signals in a first direction and the other half transmit optical signals in a second direction (opposite to the first direction). As an example, with the switching system in a first state, the optical network 300 may use the first set of optical paths 320 to transmit first optical signals in a first direction using spatial division multiplexing, and the second set of optical paths 322 to transmit second optical signals in a second direction using spatial division multiplexing. With the switching system in a second state, the optical network 300 may instead use n optical paths of the second set of optical paths 322 to transmit the first optical signals in the first direction using spatial division multiplexing, and n optical paths of the first set of optical paths 320 to transmit the second optical signals in the second direction using spatial division multiplexing.

Such an approach may be useful for other examples that utilize spatial division multiplexing, such as examples in which each optical path corresponds to a different respective core of a multicore fiber. In these examples, there may be interactions between different cores of a given fiber. These interactions may differ for optical signals propagating in the same direction and for optical signals counter-propagating (e.g. with at least one core transmitting optical signals in a different direction than another core of the same fiber). Furthermore, the interactions between optical signals typically depends on the distance between the cores used to transmit the optical signals. For example, optical signals transmitted by a core in the center of a multi-core fiber typically interact with a greater number of optical signals (transmitted by other cores) than optical signals transmitted by a core located at a periphery of the fiber. These interactions can be compensated for or exploited by appropriately configuring the direction in which each core is arranged to transmit optical signals, e.g. by controlling the state of a switching system as described in examples herein.

In examples, the state of the switching system is controlled by an appropriate control system, which is for example a computing system. For example, the computing system may generate control data for controlling the state of the switching system. The control data may be generated based on characteristic data received from the optical network, such as the characteristic data described above. As explained above, the characteristic data may be processed in various different ways to determine whether to change the state of the switching system, such as using a neural network implemented by the computing system. Such a computing system may for example be a software-defined networking system (SDN). The computing system for example generates the control data and sends the control data to a processor of or associated with the switching system or individual switching elements of the switching system (such as the OXCs 112). Such a processor may be implemented in software or in hardware, e.g. as a control circuit for controlling the state of an individual switching element based on commands received (which may be represented by the control data).

Figure 4:
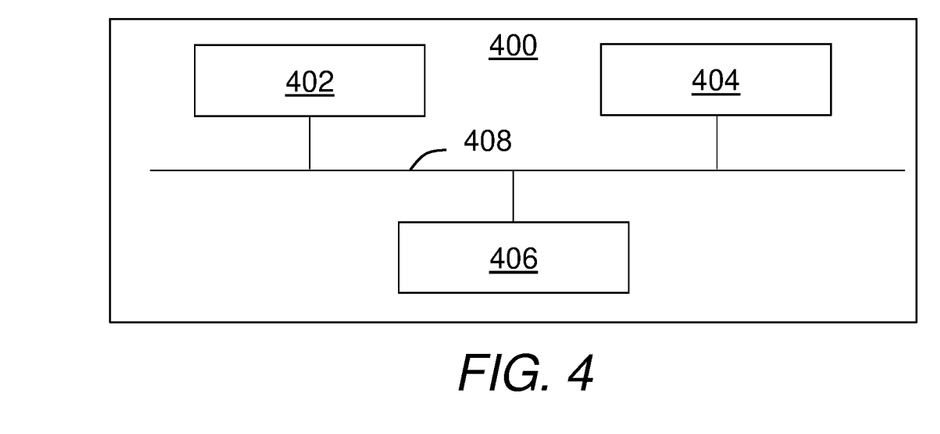
FIG. 4 is a schematic diagram of internal components of an example computing system.

FIG. 4 is a schematic diagram of internal components of an example computing system 400 that may be used to control the state of a switching system of an optical network, such as the optical networks 100, 200, 300 of FIGS. 1a to 1c, 2 and 3. The computing system 400 may include additional components not shown in FIG. 4; only those most relevant to the present disclosure are shown. The computing system 400 in FIG. 4 is implemented as a single computer device but in other cases a computing system may be implemented as a distributed system.

The computing system 400 includes storage 402 which may be or include volatile or non-volatile memory, read-only memory (ROM), or random access memory (RAM).

The storage 402 may additionally or alternatively include a storage device, which may be removable from or integrated within the computing system 400. For example, the storage 402 may include a hard disk drive (which may be an external hard disk drive such as a solid state disk) or a flash drive. The storage 402 is arranged to store data, temporarily or indefinitely. The storage 402 may be referred to as memory, which is to be understood to refer to a single memory or multiple memories operably connected to one another.

The storage 402 may be or include a non-transitory computer-readable medium. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

In the example of FIG. 4, the storage 402 of the computing system 400 is arranged to store configuration data indicative of a configuration of the optical network, e.g. a current configuration and/or a predetermined configuration (such as the configuration the optical network was installed with). The configuration data for example indicates which optical connectors are connected to which other optical connectors of the optical network. The configuration data therefore represents a structure of the optical network, from which it can be determined how an optical signal will be transmitted from one node of the optical network to another node of the optical network. The storage 402 may also or instead store characteristic data received from the optical network, which may be the same as or similar to the characteristic data described in the examples above. Control data generated by the computing system 400 for controlling a state of the switching system of the optical network may also be stored in the storage 402, e.g. in a temporary manner, before sending of the control data to the optical network.

The computing system 400 also includes at least one processor 404 which is configured to generate the control data, e.g. based on processing of the characteristic data. The at least one processor 404 may be or comprise processor circuitry. The at least one processor 404 is arranged to execute program instructions and process data. The at least one processor 404 may include a plurality of processing units operably connected to one another, including but not limited to a central processing unit (CPU) and/or a graphics processing unit (GPU).

The computing system 400 further includes a network interface 406 for connecting to at least one network, such as a local network and/or a wider network, such as the Internet. The computing system 400 can send the control data to the optical network and/or receive the characteristic data from the optical network via the network interface 406. A computing system otherwise similar to the computing system 400 of FIG. 4 may additionally include at least one further interface for connecting to at least one further component. The components of the computing system 400 are communicably coupled via a suitable bus 408.

Alternatives and Modifications

In FIGS. 1a and 1b, the switching system includes a plurality of OXCs 112, with one OXC 112 arranged at each end of an optical fiber. This is not intended to be limiting, though. For example, in other cases, the switching system may not include an OXC or may include a single OXC. In some cases, the switching system may be configured to physically move the fibers in a matrix, to change which fibers are connected to which other fibers. In other cases, though, the switching system may not physically move fibers but may instead direct an optical signal from an incoming optical fiber to a desired outgoing optical fiber in any suitable manner. It is clear from the examples of FIGS. 1a to 1c that changing the state of the switching system from the first state to the second state need not involve changing the state of each switching element of the switching system, e.g. each OXC. Instead, the state of the switching system as a whole may be changed by changing the state of at least one of the switching elements of the switching system.

The optical connections in the examples above are in the form of optical fibers. It is to be appreciated, though, that in other cases at least one of the optical connections need not include an optical fiber, but may instead be or include a different type of optical connection such as an optical free-space path.

The examples above described a switching system that is switchable from a first state to a second state. However, it is to be appreciated that a switching system may be switchable to a plurality of states, including the first state and the second state, e.g. where the switching system includes a plurality of switching elements (e.g. a plurality of OXCs, as in the example of FIGS. 1a to 1c), each with at least two states.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of configuring an optical network comprising a switching system, a first node, a second node, and an optical link between the first node and the second node, the optical link comprising a first optical connection and a second optical connection, the method comprising:
changing a state of the switching system from a first state to a second state, wherein:
in the first state the optical network is configured to use:
the first optical connection to transmit first optical signals in a first direction from the first node to the second node, and
the second optical connection to transmit second optical signals in a second direction from the second node to the first node, the second direction being opposite to the first direction; and
in the second state the optical network is configured to use:
the second optical connection to transmit the first optical signals in the first direction, and
the first optical connection to transmit the second optical signals in the second direction,
wherein determining to change the state of the switching system from the first state to the second state is based on a characteristic of at least one of: the first optical connection, the first optical signals, the second optical connection, or the second optical signals.

2. The method of claim 1, wherein changing the state of the switching system from the first state to the second state changes a difference between a first optical signal to noise ratio (SNR) associated with transmission of the first optical signals and a second optical SNR associated with transmission of the second optical signals.

3. The method of claim 2, wherein, with the switching system in the first state, the difference meets or exceeds a threshold difference.

4. The method of claim 2, wherein changing the state of the switching system from the first state to the second state reduces the difference between the first optical SNR and the second optical SNR.

5. The method of claim 2, wherein the optical network comprises an optical amplifier located such that there is a first distance between the optical amplifier and the first node and a second distance between the optical amplifier and the second node, and the difference between the first optical SNR and the second optical SNR depends on a difference between the first distance and the second distance.

6. The method of claim 2, wherein, with the switching system in the second state, at least one of:
a modulation of the first optical signals depends on the first optical SNR, or
a modulation of the second optical signals depends on the second optical SNR.

7. The method of claim 1, wherein the switching system comprises at least one optical cross-connect.

8. The method of claim 1, further comprising:
obtaining characteristic data representative of the characteristic; and
determining to change the state of the switching system based on processing of the characteristic data.

9. The method of claim 1, wherein the characteristic data is indicative of at least one of: a first optical SNR associated with transmission of the first optical signals, a first data rate associated with the first optical signals, or a first material property of the first optical connection, a second optical SNR associated with the second optical signals, a second data rate associated with the second optical signals, or a second material property of the second optical connection.

10. The method of claim 9, further comprising determining to change the state of the switching system from the first state to the second state based on determining that the first data rate is lower than the second data rate and the second optical SNR is lower than the first optical SNR.

11. The method of claim 10, wherein the first node is downstream from the second node.

12. The method of claim 1, further comprising determining to change the state of the switching system from the first state to the second state in response to a change in the characteristic.

13. The method of claim 1, wherein the optical network comprises a plurality of optical links, the plurality of optical links comprising the optical link, and determining to change the state of the switching system from the first state to the second state comprises determining to change the state of the switching system from the first state to the second state based on a plurality of characteristics each associated with a respective one of the plurality of optical links.

14. The method of claim 1, wherein the first optical connection comprises a first optical fiber and the second optical connection comprises a second optical fiber, different from the first optical fiber.

15. The method of claim 1, further comprising:
determining to change the state of the switching system from the first state to the second state; and
based on determining to change the state of the switching system, changing a modulation of at least one of the first optical signals or the second optical signals.

16. The method of claim 15, wherein changing the modulation of the at least one of the first optical signals or the second optical signals comprises changing a modulation format for modulation of the at least one of the first optical signals or the second optical signals.

17. An optical network comprising:
a first node;
a second node;
an optical link between the first node and the second node, the optical link comprising a first optical connection and a second optical connection; and
a switching system, wherein the switching system is switchable from a first state to a second state, and wherein:
in the first state the optical network is configured to use:
the first optical connection to transmit first optical signals in a first direction from the first node to the second node, and
the second optical connection to transmit second optical signals in a second direction from the second node to the first node, the second direction being opposite to the first direction; and
in the second state the optical network is configured to use:
the second optical connection to transmit the first optical signals in the first direction, and
the first optical connection to transmit the second optical signals in the second direction,
wherein determining to change a state of the switching system from the first state to the second state is based on a characteristic of at least one of: the first optical connection, the first optical signals, the second optical connection, or the second optical signals.

18. The optical network of claim 17, wherein the switching system comprises at least one optical cross-connect.

19. The optical network of claim 17, further comprising:
a first set of optical paths, the first optical connection corresponding to one of the first set of optical paths; and
a second set of optical paths, the second optical connection corresponding to one of the second set of optical paths, wherein:
with the switching system in the first state, the optical network is configured to use:
the first set of optical paths to transmit the first optical signals in the first direction using spatial division multiplexing, and
the second set of optical paths to transmit the second optical signals in the second direction using spatial division multiplexing; and
with the switching system in the second state, the optical network is configured to use:
n optical paths of the second set of optical paths to transmit the first optical signals in the first direction using spatial division multiplexing, where n is an integer, and
n optical paths of the first set of optical paths to transmit the second optical signals in the second direction using spatial division multiplexing.

20. The optical network of claim 19, wherein each of the first set of optical paths and each of the second set of optical paths comprises a different respective optical fiber.

21. A computing system for configuring the optical network of claim 17, wherein the computing system is configured to generate control data for controlling a state of the switching system.

22. The computing system of claim 21, wherein the computing system is configured to:
receive, from the optical network, characteristic data indicative of a characteristic of at least one of: the first optical connection, the first optical signals, the second optical connection, or the second optical signals; and
generate the control data based on the characteristic data.

23. The computing system of claim 21, wherein the computing system is configured to:

determine that, with the switching system in the first state, a difference between a first optical signal to noise ratio (SNR) associated with transmission of the first optical signals using the first set of optical connections and a second optical SNR associated with transmission of the second optical signals using the second set of optical conditions meets or exceeds a threshold difference; and in response to the determining, generate the control data to change the state of the switching system from the first state to the second state.

24. A method of operating an optical network comprising a switching system, a first node, a second node, and an optical link between the first node and the second node, the optical link comprising a first optical connection and a second optical connection, the method comprising:

with the switching system in a first state:
 transmitting first optical signals in a first direction from the first node to the second node, using the first optical connection, and
 transmitting second optical signals in a second direction from the second node to the first node, using the second optical connection, the second direction being opposite to the first connection;

changing a state of the switching system from the first state to a second state, wherein determining to change the state of the switching system from the first state to the second state is based on a characteristic of at least one of: the first optical connection, the first optical signals, the second optical connection, or the second optical signals; and with the switching system in the second state:
 transmitting the first optical signals in the first direction, using the second optical connection, and
 transmitting the second optical signals in the second direction, using the first optical connection.

\* \* \* \* \*